United States Patent [19]
Moore

[11] Patent Number: 6,138,932
[45] Date of Patent: Oct. 31, 2000

[54] WOOD CHIPPER WITH LOADING BOOM

[75] Inventor: Michael D. Moore, Pella, Iowa

[73] Assignee: Vermeer Manufacturing Company, Pella, Iowa

[21] Appl. No.: 09/347,843

[22] Filed: Jul. 2, 1999

[51] Int. Cl.[7] ........................................................... B02C 17/02
[52] U.S. Cl. ........................ 241/92; 241/101.76; 241/280
[58] Field of Search ........................... 241/92, 280, 101.76

[56] References Cited

U.S. PATENT DOCUMENTS

| | | |
|---|---|---|
| Re. 33,233 | 6/1990 | Freeman . |
| 3,559,898 | 2/1971 | Rinke . |
| 3,642,041 | 2/1972 | Hamilton et al. . |
| 3,844,489 | 10/1974 | Strong . |
| 3,945,517 | 3/1976 | Carley . |
| 3,989,198 | 11/1976 | Blasko . |
| 4,076,061 | 2/1978 | Greeninger . |
| 4,176,696 | 12/1979 | Greeninger . |
| 4,390,132 | 6/1983 | Hutson et al. . |
| 4,398,581 | 8/1983 | Aikins et al. . |
| 4,805,676 | 2/1989 | Aikins . |
| 4,898,221 | 2/1990 | Eriksson . |
| 5,010,933 | 4/1991 | Doyle . |
| 5,349,999 | 9/1994 | Peterson et al. . |
| 5,692,548 | 12/1997 | Bouwers et al. . |
| 5,692,549 | 12/1997 | Eggers . |

FOREIGN PATENT DOCUMENTS

| | | |
|---|---|---|
| 44 16 195 | 11/1994 | Germany . |
| 674730 | 7/1979 | U.S.S.R. . |

OTHER PUBLICATIONS

Four (4) Photos of Vermeer Prototype Chipper.

Bandit Model 150, 200+ & 250, The 12" Capacity Brush Disc—Style Chippers brochure, Bandit Industries, Inc., 4 pages (Jul. 1995).

Vermeer® BC2000 Brush Chipper brochure, Vemeer Manufacturing, 4 pages (1999).

*Primary Examiner*—Mark Rosenbaum
*Attorney, Agent, or Firm*—Merchant & Gould P.C.

[57] ABSTRACT

The present disclosure relates a wood chipper including a support frame, a cutter housing supported by the support frame, cutter mechanism positioned within the cutter housing, a feed housing supported by the support frame, and a feed mechanism positioned within the feed housing for feeding a log into the cutter mechanism. A feed table extends outward from the feed housing. The feed table is elevated above ground level and is positioned for supporting the log as the log is fed into the feed mechanism. The feed table has an outer edge located a position opposite from the feed housing. The wood chipper also includes an elongated boom that is mounted on the feed housing and that extends over the feed table. The boom works in combination with a winch including a flexible member that extends over the feed table via support provided by the boom. The boom includes an end guide over which the flexible member passes. The end guide is positioned such that when the winch pulls the log toward the table, the boom causes an end of the log to be lifted by the flexible member past the outer edge of the feed table and onto a top surface of the feed table.

7 Claims, 8 Drawing Sheets

6,138,932

WOOD CHIPPER WITH LOADING BOOM

FIELD OF THE INVENTION

The present relates generally to wood chippers. More particularly, the present invention relates a wood chipper having a winch for facilitating loading the wood chipper.

BACKGROUND OF THE INVENTION

U.S. Pat. No. 5,692,548 to Bouwers et al. discloses one type of prior art wood chipper. The chipper includes a rotating cutting drum adapted to cut wood into small chips that are propelled through a discharge chute. Feed rollers are used to feed the wood desired to be chipped from an inlet into a cutting path of the rotatable cutting drum.

In recent years, the size of mobile wood chippers has increased. Wood chippers capable of processing logs having 18 to 20 inch diameters are now common. As the capacity of chippers has increased, loading of the chippers has become more difficult. This is understandable when it is considered that 18 inch diameter logs can weigh approximately 100 pounds per foot.

SUMMARY OF THE INVENTION

One aspect of the present invention relates to a wood chipper including a cutter mechanism and a feed mechanism for feeding a log into the cutter mechanism. The feed mechanism is at least partially enclosed in a feed housing. A feed table extends outward from the feed housing. The feed table is elevated above ground level and is positioned for supporting the log as the log is fed into the feed mechanism. The feed table has an outer edge located at a position opposite from the feed housing. An elongated boom is mounted on the feed housing and extends over the feed table. The elongated boom works in cooperation with a winch including a flexible member that extends over the feed table via support provided by the boom. The flexible member rides over an end guide positioned at a free end of the boom. The end guide is orientated such that when the winch is used to pull the log toward the feed table, the boom causes an end of the log to be lifted by the flexible member past the outer edge of the feed table and onto a top surface of the feed table.

Another aspect of the invention relates to a wood chipper including a cutter mechanism, a feed mechanism for feeding wood into the cutter mechanism and a feed table extending outward from the feed mechanism. The feed table is elevated above ground level and is positioned for supporting a log as the log is fed into the feed mechanism. The feed table has an outer edge located at a position opposite from the feed mechanism. The wood chipper also includes an elongated boom that extends over the feed table, and a winch including a flexible member that is held over the feed table by support provided by the boom. The boom includes an end guide over which the flexible member passes. The end guide is intersected by a reference line that also intersects the outer edge of the feed table. The reference line is aligned at an angle in the range of 5–27 degrees relative to vertical.

A further aspect of the present invention relates to a method for loading a wood chipper including providing a wood chipper including a cutting mechanism, a feed mechanism for feeding logs into the cutter mechanism, and a feed table extending away from the feed mechanism. The method also includes providing a boom that extends over the feed table, and providing a winch including a flexible member supported over the feed table by the boom. The method further includes connecting the flexible member to a log, and dragging the log toward the feed table with the winch. The winch is operated such that the flexible member lifts an end of the log toward a location of the boom where the flexible member separates from the boom. The separation location is positioned inside an outer edge of the feed table such that as the end of the log is lifted toward the separation location, the end of the log clears the outer edge of the feed table and is lifted onto a top surface of the feed table.

Still another aspect of the present invention relates to a wood chipper including a cutter mechanism, a feed mechanism for feeding wood into the cutter mechanism, a winch powered by a winch motor, and a control system for preventing the winch motor and the feed mechanism from being operated concurrently.

The various aspects of the present invention provide numerous advantages over the prior art. For example, certain aspects of the present invention provide a relatively inexpensive apparatus that allows heavy logs to be efficiently loaded into a wood chipper. Certain other aspects of the present invention relate to configurations adapted for reducing the likelihood of entangling a winch cable in the feed mechanism of a chipper. A variety of additional advantages of the various aspects of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
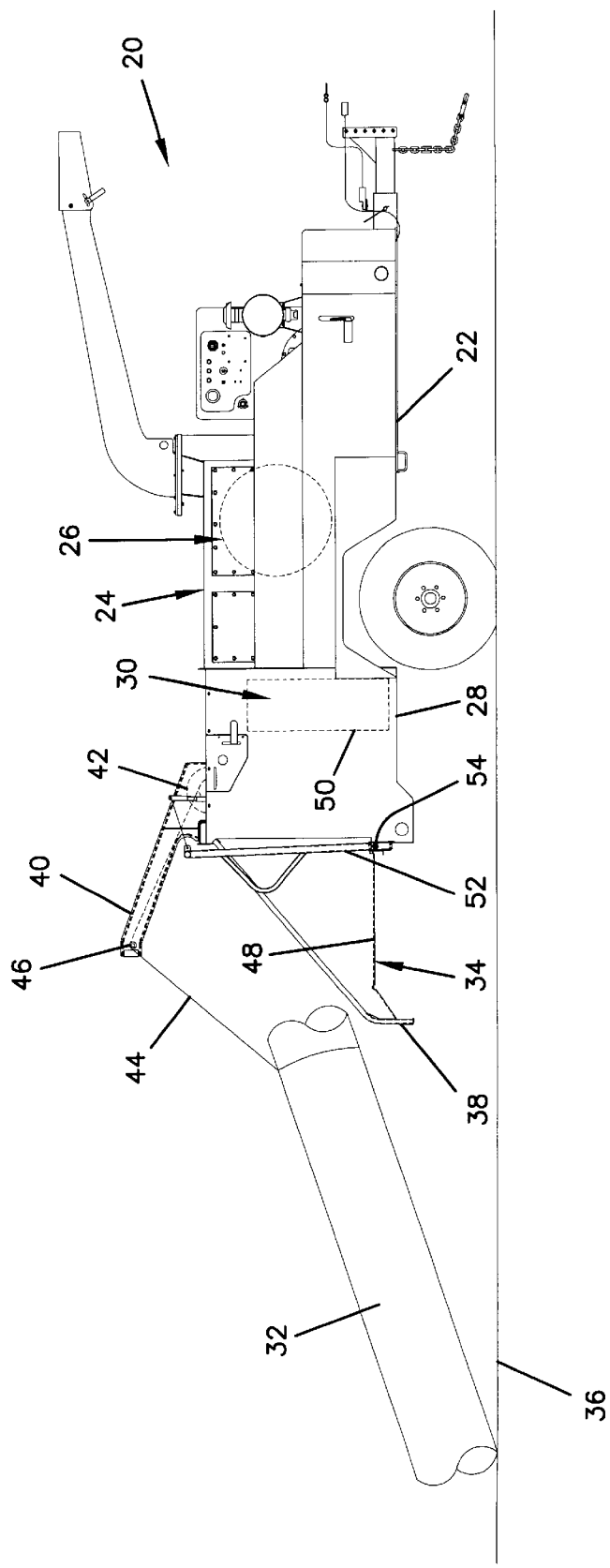
FIG. 1 illustrates a wood chipper constructed in accordance with the principles of the present invention.

FIG. 1 illustrates a wood chipper 20 constructed in accordance with the principles of the present invention. The wood chipper 20 includes a frame 22 (e.g., a trailer structure), a cutter housing 24 supported on the frame 22, and a cutter mechanism 26 positioned within the cutter housing 24. A feed housing 28 is also supported on the frame 22. The feed housing 28 encloses a feed mechanism 30 adapted for feeding a log 32 into the cutter mechanism 26. The feed housing 28 is located between the cutter mechanism 26 and a feed table 34 that extends outward from the feed housing 28. The feed table 34 is elevated above ground level 36 and is positioned for supporting the log 32 as the log 32 is fed into the feed mechanism 30. The feed table 34 includes an outer edge 38 located at a position distant or opposite from the feed housing 28. The wood chipper also includes an elongated boom 40 that is mounted on the feed housing 28 and that extends over the feed table 34. The boom 40 works in combination with a winch 42. The winch 42 includes a flexible member 44 (e.g., a cable, rope, chain or other type of cable-like structure ) that is supported over the feed table 34 by the boom 40. An end guide 46 is positioned adjacent to a free end of the boom 40. The flexible member 44 passes over the end guide 46 and separates from the boom 40 at a location directly adjacent to the end guide 46. By connecting the flexible member 44 to the log 32, the winch 42 can be used to drag the log 32 toward the feed table 34. The end guide 46 is preferably positioned such that when the winch 42 drags the log 32 toward the feed table 34, the boom 40 causes an end of the log 32 to be lifted by the flexible member 44 past the outer edge 38 of the feed table 34 and onto a top surface 48 (e.g., a platform or deck) of the feed table 34.

In FIG. 1, the cutter mechanism 26 is shown as a chipping or cutting drum. However, it will be appreciated that any type of cutting or chipping mechanism (e.g., a disk cutter) could also be used. Also, the feed mechanism 30 shown in FIG. 1 includes two vertical feed rollers 50 (only one shown). However, similar to the cutter mechanism 26, any type of feed mechanism could be used. For example, a single feed roller, horizontal feed rollers, belts, or any other type of conveying mechanism could also be used. The feed mechanism 30 is controlled by a control bar 52 located adjacent to the feed table 34.

The feed table 34 is preferably pivotally connected to the feed housing 28 at horizontal pivot axis 54. The feed table 34 is typically pivoted up during transport of the wood chipper 20. The top surface 48 of the feed table 34 is adapted for supporting the log 32 as the log 32 is fed into the feed mechanism 30. In a preferred embodiment, the feed table 34 extends about 24 to 48 inches outward from the feed housing 28. Adjacent the outer edge 38 of the feed table 34, the top surface 48 is preferably angled downward to facilitate loading the log 32.

Figure 3:
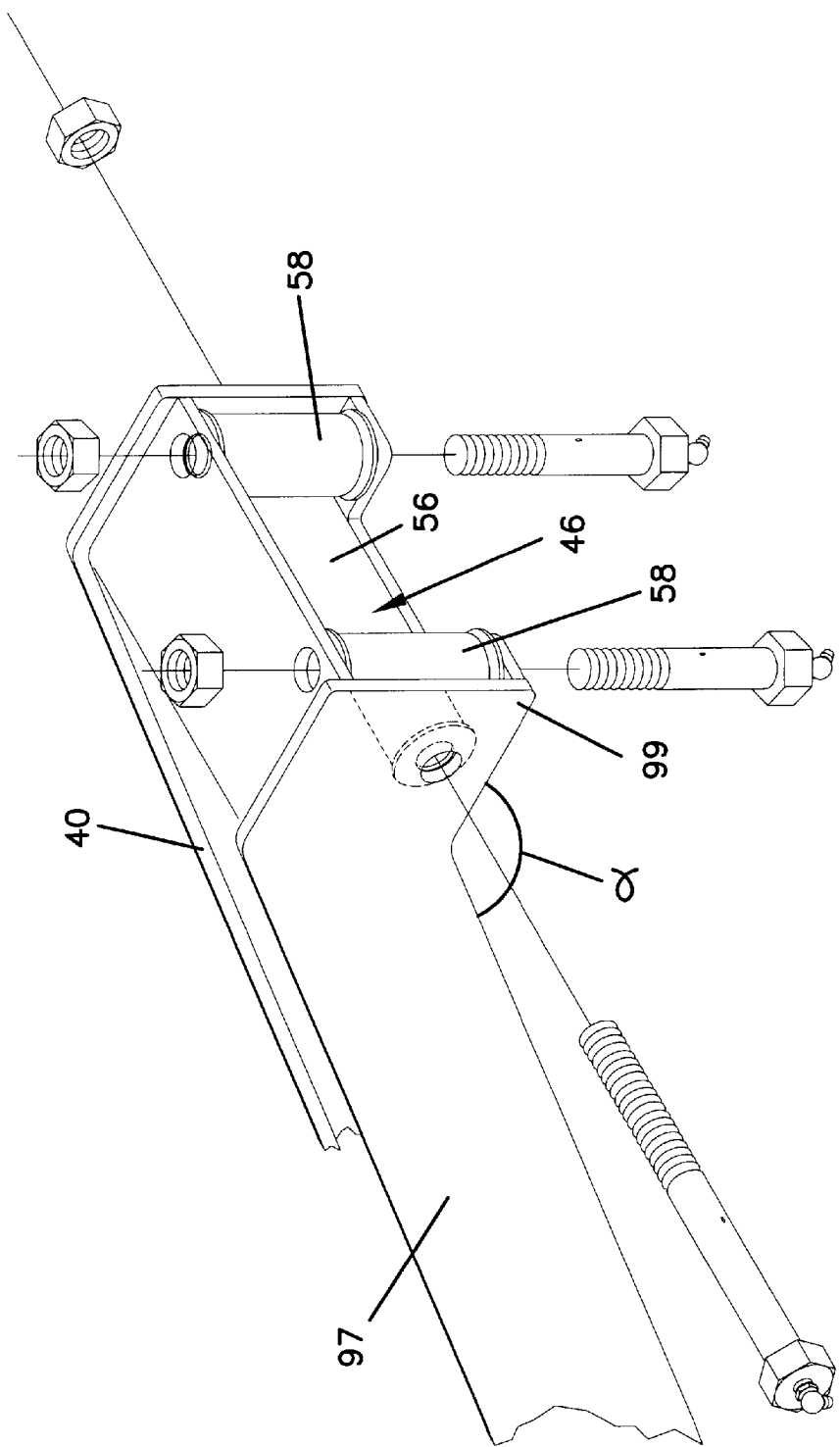
FIG. 3 is a perspective view of a free end of a boom used by the wood chipper of FIG. 1.

Referring to FIG. 3, the end guide 46 is shown as a horizontal fairlead 56. While such a fairlead 56 is preferred, it will be appreciated that in certain embodiments, the end guide 46 may not be rotatable relative to the boom 40. For example, the end guide 46 could comprise a fixed member or a surface that is integral with the boom 40. Referring still to FIG. 3, vertical fairleads 58 are also rotatably mounted at the free end of the boom 40. The horizontal and vertical fairleads 56 and 58 assist in preventing abrasive wear of the flexible member 44.

Figure 2:
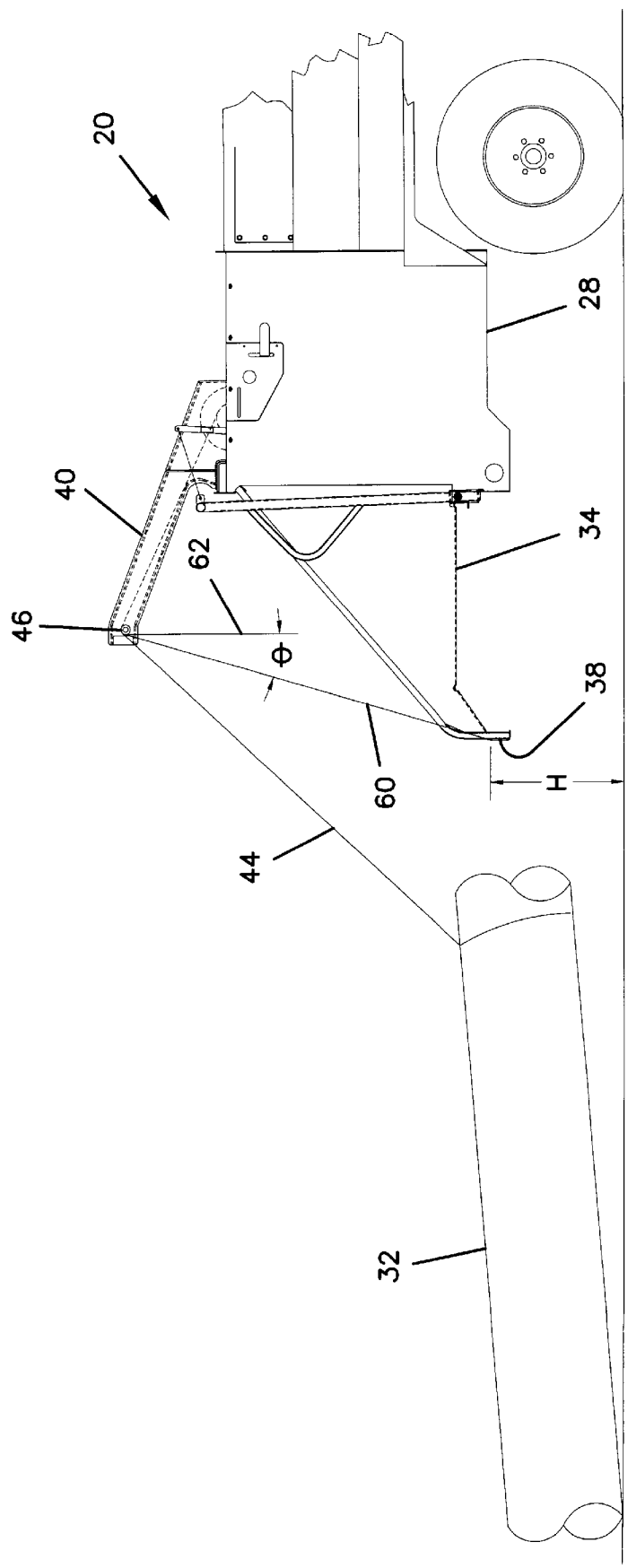
FIG. 2 is an enlarged view of a back end portion of the wood chipper of FIG. 1.

By positioning the end guide 46 of the boom 40 at a predetermined position relative to the outer edge 38 of the feed table 34, the boom 40 and winch 42 can cooperate to lift the log 32 onto the feed table 34 without catching the log 32 on the outer edge 38 of the feed table 34. Referring to FIG. 2, the end guide 46 is positioned inside the outer edge 38 of the feed table 34. In other words, the end guide 46 is positioned between the feed housing 28 and a vertical plane that intersects the outer edge 38. Referring still to FIG. 2, the end guide 46 is shown intersected (e.g., contacted) by a reference line 60 that also intersects the outer edge 38 of the feed table 34. The line 60 forms an angle θ with respect vertical line 62. In one particular embodiment of the present invention, the angle θ is in the range of 5–27 degrees. In another embodiment, the angle θ is in the range of 10–22 degrees. In still another embodiment of the present invention, the angle θ is in the range of 15–17 degrees.

The loading of a log onto the feed table 34 is a function of log length and feed table height. The ranges calculated above are based on a feed table height H of about 19 inches and desired log lengths of about 6 feet. It will be appreciated that the present invention is not limited to the particular dimensions identified above, and that such dimensions are preferred ranges determined to be suitable at least for the preferred log length and table height identified above.

Referring again to FIG. 2, the base of the boom 40 is preferably fixedly connected to the top of the feed housing 28. In this manner, the end guide 46 is fixed at a predetermined location relative to the outer edge 38. However, it will be appreciated that in alternative embodiments the boom 40 could be retractable. For example, the boom 40 could have a telescopic configuration. Alternatively, the boom 40 could pivot or otherwise move relative to the feed housing 28. For example, the base of the boom 40 could pivot about either a horizontal or vertical axis.

Figure 4:
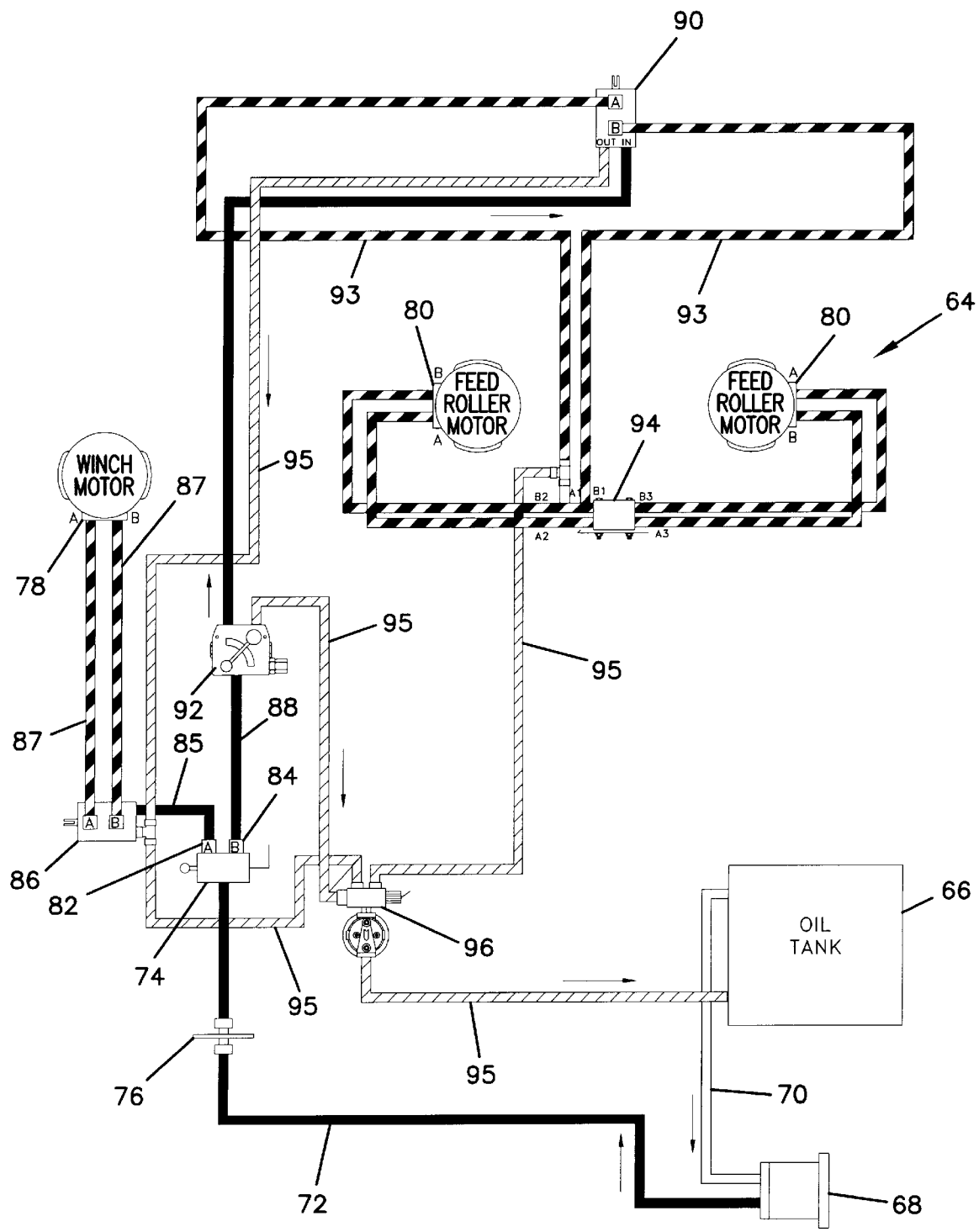
FIG. 4 is a schematic diagram of a hydraulic system suitable for use with the wood chipper of FIG. 1.

FIG. 4 shows a schematic illustration of a hydraulic circuit/system 64 suitable for use with the wood chipper 20. A hydraulic pump 68 draws hydraulic fluid from a reservoir tank 66 through suction line 70. The pump 68 forces hydraulic fluid through pressure line 72 to a selector valve 74. A bulk head 76 is positioned along the pressure line 72.

The selector valve 74 controls whether hydraulic fluid is directed to a winch motor 78 or feed roller motors 80. For example, the selector valve 74 has two outlet ports 82 and 84. When the selector valve 74 is in a first position, the port 84 is blocked and the port 82 is open such that flow is directed through pressure line 85 to a winch control valve 86. The winch control valve 86 controls the direction of rotation of the winch motor 78 by controlling the direction of flow through pressure/return lines 87. The winch control valve 86 also has a neutral position.

When the selector valve 74 is in a second position, outlet port 82 is blocked and outlet port 84 is open such that flow is directed through pressure line 88 to a feed roller motor control valve 90. A flow control valve 92 allows the speed of the feed roller motors 80 to be adjusted. The control valve 90 is preferably actuated by the control bar 52 (shown in FIG. 1) and functions to control the direction of rotation of the feed rollers 50. For example, the control valve 90 controls the direction of rotation of the feed rollers 50 by controlling the direction of fluid flow through pressure/ return lines 93. The control valve 90 also has a neutral position.

The pressure/return lines 93 are coupled to a combiner/ divider 94. With respect to flow traveling through the pressure/return lines 93 toward the feed roller motors 80, the combiner/divider 94 functions as a divider for dividing flow between the two feed roller motors 80. With respect to flow traveling from the feed roller motors 80 toward the combiner/divider 94, the combiner/divider 94 functions as a combiner for combining fluid flow from the two feed roller motors 80 and forwarding the combined flow to a corresponding one of the pressure/return lines 93.

During chipping operations, the cutter mechanism 26 can tend to pull logs being chipped toward the chipper 20.

Consequently, the combiner/divider 94 preferably also comprises a pilot operated valve for locking the feed rollers 50 to resist self-feeding.

The hydraulic system also includes a plurality of return lines 95 for conveying hydraulic fluid from the various components of the system back to the oil tank 66. A solenoid valve 96 is positioned along the return lines 95. The solenoid valve 96 interfaces with a sensor (not shown) that monitors the operating condition of an engine (not shown) that drives the hydraulic pump 68. When the sensor (not shown) detects that the engine (not shown) is approaching a stall condition, the sensor (not shown) causes the solenoid valve 96 to stop the operation of the feed roller motors 80.

Figure 6:
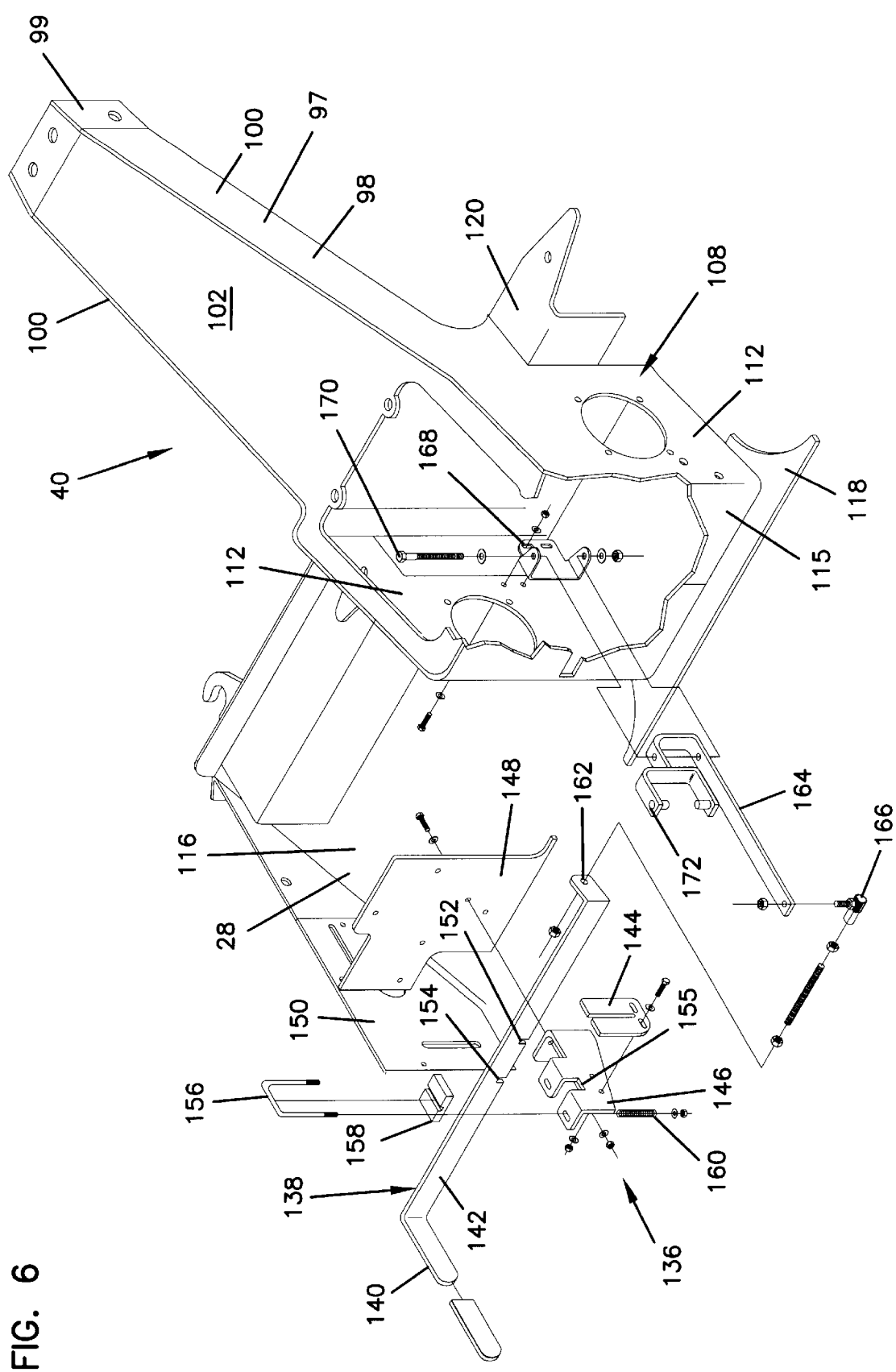
FIG. 6 is an exploded view of a winch disengage mechanism suitable for use with the wood chipper of FIG. 1.
Figure 7:
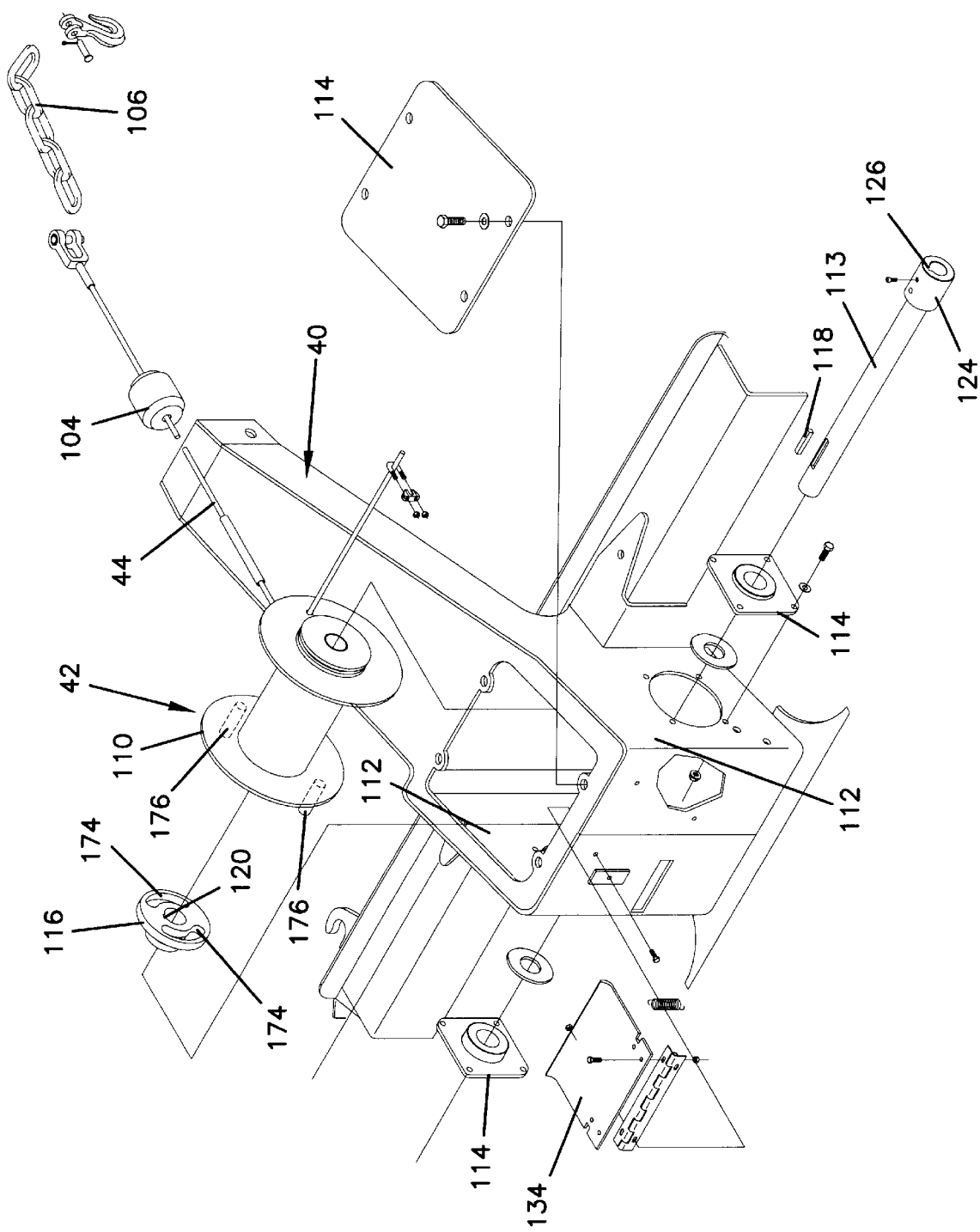
FIG. 7 is an exploded view of a winch drum assembly suitable for use with the wood chipper of FIG. 1.
Figure 8:
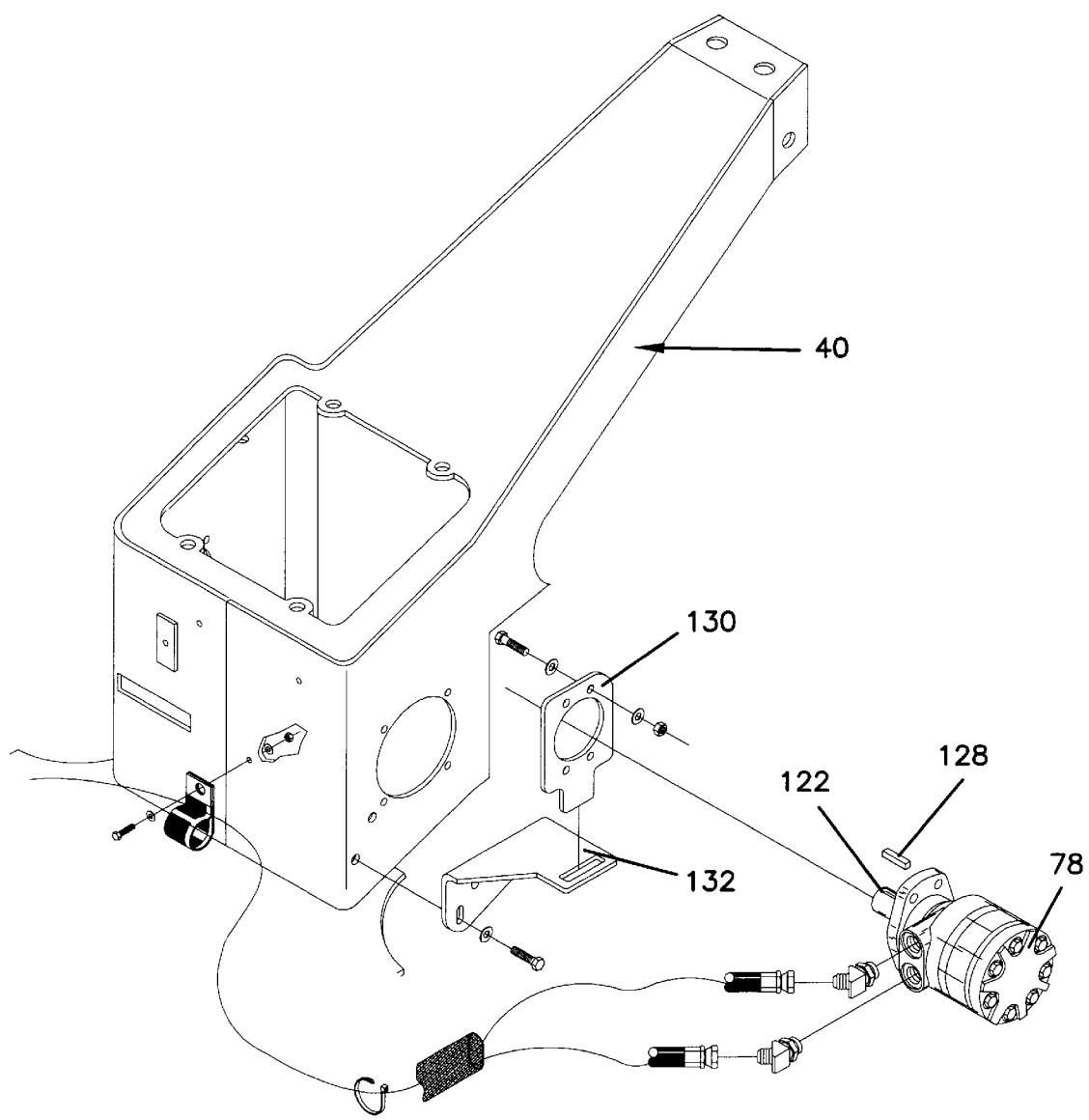
FIG. 8 is an exploded view of a drive motor assembly suitable for use with the wood chipper of FIG. 1.

Referring to FIGS. 6–8, various perspective views of the boom 40 are illustrated. As shown in FIG. 6, the boom 40 includes an elongated portion 98 that is inclined and that extends away from the feed housing 28. The elongated portion 98 includes a main portion 97 that extends from the feed housing 28 over the feed table 34. The main portion 97 is oriented at an angle relative to horizontal such that the main portion 97 inclines as the main portion 97 extends over the feed table 34 in a direction away from the feed housing 28. The elongated boom portion 98 also includes a nose portion 99 that extends outward from a distal end of the main portion 97. As best shown in FIG. 3, the nose portion 99 is aligned at an angle α relative to the main portion 97, and the fairleads 56 and 58 are mounted within the nose portion 99. The elongated portion 98 includes opposing side walls 100 that converge toward one another as the side walls 100 extend away from the feed housing 28. The side walls 100 are interconnected by a top wall 102 and a bottom wall (not shown in FIG. 6) that opposes the top wall 102. The elongated portion 98 is hollow and defines a channel for receiving the flexible member 44 of the winch 42. As shown in FIG. 7, the flexible member 44 includes a stop 104 for preventing the flexible member 44 from being pulled too far within the boom 40. The flexible member 44 also includes an end chain 106 that facilitates connecting the flexible member 44 to a piece of wood such as a log.

Referring again to FIG. 6, the boom 40 also includes a base portion 108. The base portion 108 forms a generally box-shaped housing for enclosing a winch drum 110 (shown in FIG. 7). The base portion 108 includes two side walls 112, a front wall 115, and a removable top cover plate 114 (shown in FIG. 7). The base portion 108 is fixedly mounted on an inclined top wall 117 of the feed housing 28. A front edge of the base portion 108 is fixedly secured (e.g., welded) to the top wall 117 through the use of a reinforcing member 118. The rear edge of the base portion 108 is reinforced by an angle member 120. As best shown by the cutaway portion of FIG. 5, the angle member 120 fits over (e.g., nests with) and is fixedly connected to another angle member 122 to provide a double reinforcement. The lower edge of the angle member 122 is fixedly connected to the inclined top wall 117 of the feed housing 28, while an upper end of the angle member 122 is fixedly connected to a vertical lip 124 that projects upward from the inclined top wall 117. The angle member 122, the vertical lip 124 and the inclined top wall 117 cooperate to form a reinforcing box structure. Such a structure is adapted to provide sufficient reinforcement for supporting loading applied to the feed housing 28 through the boom 40.

FIG. 6 also illustrates a winch disengage/engage mechanism 136. The mechanism 136 includes a manual actuation member 138 including a handle end 140 aligned at right angles with respect to an elongated portion 142. The elongated portion 142 fits within a slotted member 144 bolted to a detent mount 146. The detent mount 146 is connected to a mounting flange 148 that is connected to the top wall 117 of the feed housing 28. The elongated portion 142 defines first and second longitudinally spaced-apart notches 152 and 154. The notches 152 and 154 are sized to receive a portion 155. A U-shaped member 156 is mounted over the elongated portion 142. A wear block 158 is positioned between the U-shaped member 156 and the elongated portion 142. Springs 160 (one shown) resiliently bias the U-shaped member 156 downward against the elongated portion 142. An end 162 of the elongated portion 142 is connected to a fork member 164 by a universal joint 166. The fork member is pivotally connected to one of the side walls 112 of the base portion 108 by a mounting bracket 168 and a mounting pin 170. The fork member 164 includes a fork 172. When assembled, the fork 172 is connected to a slide member 116 (shown in FIG. 7) used to engage and disengage the winch drum 110.

Referring to FIG. 7, the winch drum 110 of the winch 42 is mounted on a drive shaft 113. The drive shaft 113 is journalled within bushings 114 secured to the side walls 112 of the base portion 108. The drive shaft 113 is coupled to a winch drive motor 78 (shown in FIG. 8). For example, an output shaft 122 of the winch motor 78 preferably fits within a coupling 124 mounted on the drive shaft 113. The coupling 124 defines a key way 126 that receives a key 128 of the output shaft 122. The key and key way configuration allows torque from the winch motor 78 to be transferred directly to the drive shaft 113. As shown in FIG. 8, a torque arm 130 and bracket 132 are used to resist rotation of the winch motor housing.

The slide member 116 is mounted on the shaft 113, and can slide axially along the shaft 113. A key 118 of the shaft 113 fits within a corresponding key way 120 of the slide member 116 to prevent relative rotation between the slide member 116 and the drive shaft 113. The slide member 116 defines two curved slots 174. The curved slots 174 are sized to receive pins 176 that project axially outward from an end of the winch drum 110 that faces the slide member 116. The winch drum 110 is engaged by sliding the slide member 116 toward the winch drum 110 such that the pins 176 fit within the curved slots 174. In such a configuration, torque is transferred from the drive shaft 113 through the slide member 116 to the winch drum 110. To disengage the winch drum 110, the slide member 116 is slid away from the winch drum 110 such that the pins 176 are displaced from the curved slots 174. In such a configuration, the winch drum 110 can free spool relative to the drive shaft 112. A pressure plate 134 provides a predetermined amount of resistance against the winch drum 110 when the winch drum 110 is free spooling. The plate 134 is pivotally connected to the front wall 115, and is biased downward by a spring.

The slide member 116 is engaged and disengaged from the drum 110 by manually moving the actuating member 138 of the mechanism 136 between an engage position and a disengage position. When the actuating member 138 is in the disengage position, portion 155 of the detent mount 146 fits within the first notch 152 and the fork member 164 holds the slide member 116 away from the winch drum 110 such that the winch drum 110 is disengaged from the slide member 116. When the actuating member 138 is in the engage position, portion 155 of the detent mount 146 is received in the second notch 154, and the fork member 164 holds the slide member 116 directly adjacent to the winch drum 110 such that torque is transferred between the winch drum 110 and the slide member 116.

To move the manual actuating member 138 from the disengage position to the engage position, the actuating member 138 is manually lifted upward against the resistance of the U-shaped member 156 such that the first notch 152 clears the detent mount 146. Next, the actuating member 138 is manually pushed inward until the second notch 154 interlocks with the detent mount 146. To move the actuating member 138 from the engaged position to the disengage position, the actuating member 138 is lifted against the resistance provided by the U-shaped member 156 such that the second notch 154 clears the detent mount 146. Next, the actuating member 138 is pulled outward until the first notch 152 interlocks with the detent mount 146.

Figure 5:
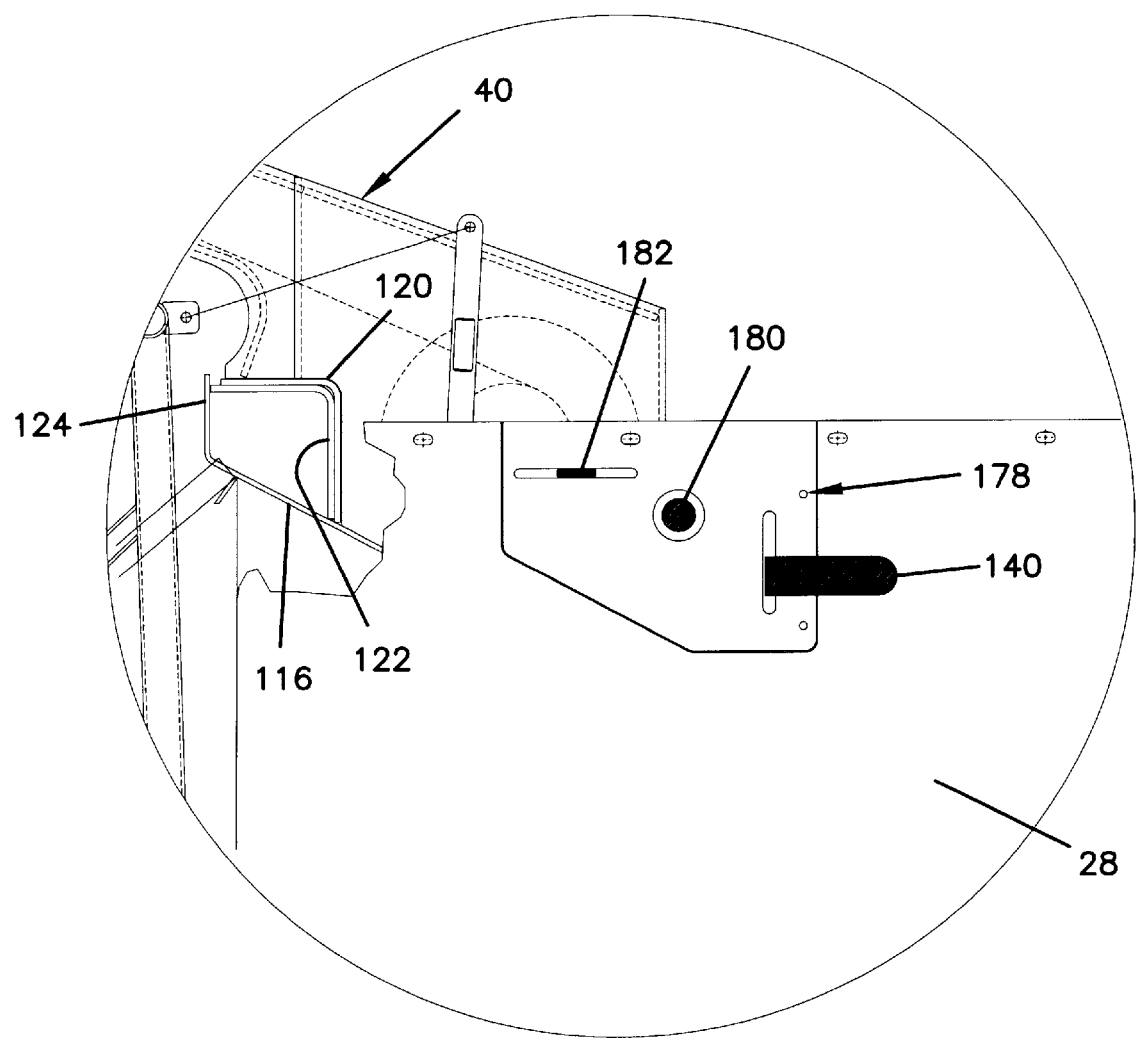
FIG. 5 is an enlarged view of a winch control panel of the wood chipper of FIG. 1.

Referring to FIG. 5, a winch control panel 178 is illustrated. The winch control panel 178 includes the handle 140 of the manual actuating member 138. As previously described, the winch drum 110 is engaged by lifting the handle 140 and pushing the handle inward. Similarly, the winch drum 110 is disengaged by lifting the handle 140 and pulling the handle outward. The control panel 178 also includes an actuation member 180 connected to the selector valve 74 (shown in FIG. 4). The actuation member 180 is used to control whether the feed rollers or the winch 42 is operated. When the actuation member 180 is pushed in, the feed rollers 50 can be operated, and the winch 42 cannot be operated. When the actuation member 180 is pulled out, the winch 42 can be operated, and the feed rollers 50 cannot be operated.

The control panel 178 further includes a winch direction control member 182. The direction control member 182 is used to control the direction of the winch 42 and is connected to the winch control valve 86 (shown in FIG. 4). When the direction control member 182 is pushed to the left, the winch 42 pulls the flexible member 44 into the boom 40. When the direction control member 182 is pushed to the right, the winch 42 lets the flexible member 44 out of the boom 40.

The winch 42 is preferably used to facilitate loading wood, such as the log 32, onto the feed table 34 and into the feed mechanism 30. To use the winch 42, the winch 42 is preferably first disengaged thereby allowing the winch drum 110 to free spool. By allowing the winch drum 110 to free spool, the flexible member 44 can be manually pulled out and attached to the log 32. Once the flexible member 44 is connected to the log 32, the winch 42 is engaged causing the flexible member 44 to be wound on the winch drum 110 and pulled back into the boom 40. As the flexible member 44 is wound on the winch drum 110, the log 32 is dragged toward the feed table 34. When the log 32 approaches the feed table 34, an end of the log 32 is lifted upward toward a location of the boom 40 where the flexible member 44 separates from the boom 40 (i.e., the end guide 46). As the end of the log 32 is lifted toward the end guide 46, the end of the log 32 clears the outer edge 38 of the feed table 34 and is lifted onto the top surface 48 of the feed table 34. After the end of the log 32 has been lifted onto the feed table 34, the flexible member 44 can be disconnected from the end of the log 32 and reconnected at a mid-region of the log 32. Preferably, the mid region of the log 32 is located beyond the outer edge 38 of the feed table 34. With the flexible member 44 connected to the mid-region of the log 32, the winch 42 is again activated such that the flexible member 44 is drawn into the boom 40. In this manner, the flexible member 44 moves the log 32 along the top surface 48 of the feed table 34 and feeds the end portion of the log 32 into the feed mechanism 30.

With the regard to the foregoing description, it is to be understood that changes may be made in detail, especially in matters of the construction materials employed and the shape, size and arrangement of the parts without departing from the scope of the present invention. It is intended that the specification and depicted aspects be considered exemplary only, with a true scope and spirit of the invention being indicated by the broad meaning of the following claims.

What is claimed:

1. A wood chipper comprising:

a support frame;

a cutter housing supported by the support frame;

a cutter mechanism positioned within the cutter housing;

a feed housing supported by the support frame;

a feed mechanism positioned within the feed housing for feeding a log into the cutter mechanism;

a feed table extending outward from the feed housing, the feed table being elevated above ground level and being positioned for supporting the log as the log is fed into the feed mechanism, the feed table having an outer edge located at a position opposite from the feed housing;

an elongated boom that is mounted on the feed housing, the boom including a main portion that extends from the feed housing over the feed table, the main portion being oriented at an angle relative to horizontal such the main portion inclines as the main portion extends over the feed table in a direction away from the feed housing, the elongated boom also including a nose portion that extends outward from a distal end of the main portion, the nose portion being aligned at an angle relative to the main portion;

a winch including a flexible member that extends over the feed table via support provided by the boom, the winch being adapted for pulling the log toward the feed table; and the boom including an end guide over which the flexible member passes, the end guide being located at the nose portion of the boom and being positioned such that when the winch pulls the log toward the feed table, the boom causes an end of the log to be lifted by the flexible member past the outer edge of the feed table and onto a top surface of the feed table.

2. The wood chipper of claim 1, wherein the flexible member comprises a cable.

3. The wood chipper of claim 1, wherein the cutting mechanism comprises a chipping drum.

4. The wood chipper of claim 1, wherein the feed mechanism includes at least one feed roller.

5. The wood chipper of claim 1, wherein the boom is fixedly mounted on the feed housing such that the boom can not pivot relative to the feed housing.

6. The wood chipper of claim 1, wherein the end guide comprises a horizontal fairlead mounted within the nose portion of the boom.

7. The wood chipper of claim 6, further comprising vertical fairleads mounted within the nose portion of the boom on opposite sides of the horizontal fairlead.

* * * * *